No. 626,294. Patented June 6, 1899.
E. J. PENNINGTON.
SELF PROPELLED VEHICLE.
(Application filed Oct. 23, 1898.)

(No Model.)

Witnesses:
J. M. Fowler Jr.
Elizabeth Crippit

Inventor:
Edward J. Pennington
by Church & Church
his Attorneys.

THE NORRIS PETERS CO., PHOTO-LITHO., WASHINGTON, D. C.

UNITED STATES PATENT OFFICE.

EDWARD JOEL PENNINGTON, OF COVENTRY, ENGLAND.

SELF-PROPELLED VEHICLE.

SPECIFICATION forming part of Letters Patent No. 626,294, dated June 6, 1899.

Application filed October 23, 1896. Serial No. 609,798. (No model.)

*To all whom it may concern:*

Be it known that I, EDWARD JOEL PENNINGTON, a citizen of the United States, residing at Coventry, in the county of Warwick, England, have invented certain new and useful Improvements in or Relating to Self-Propelled Vehicles, (for which I have obtained a patent in Great Britain, No. 20,161, dated September 11, 1896,) of which the following is a specification.

This invention relates to self-propelled vehicles, preferably three-wheeled, the chief features of which are illustrated in the accompanying drawings by way of example in their application to a three-wheeled vehicle.

Figure 1:
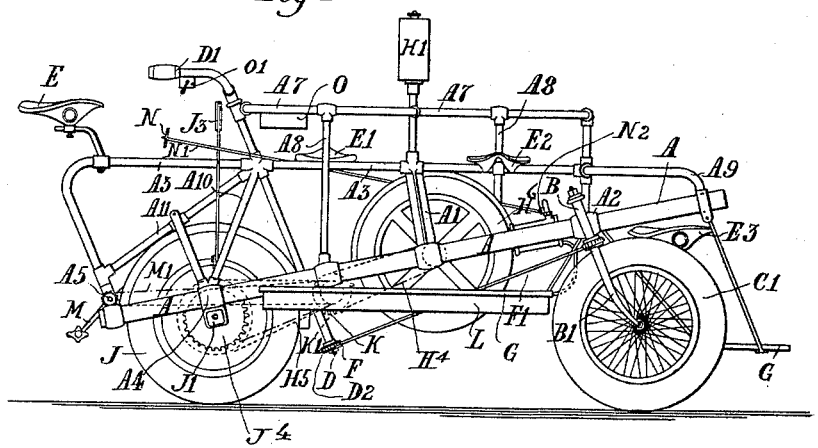
Figure 2:
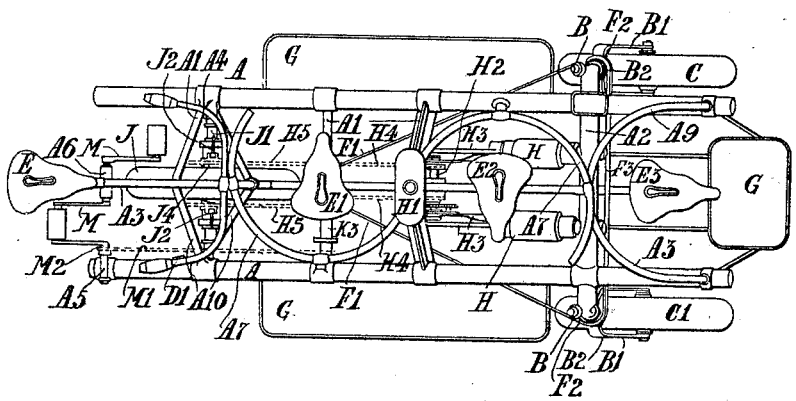

In the drawings, Figure 1 is a side elevation, and Fig. 2 is a plan, of the said vehicle.

Like letters indicate like parts throughout the drawings.

The framework is tubular and comprises two inclined longitudinal tubes A, bound together where necessary by cross frames or connections A' and carrying at the front end a cross-tube $A^2$, which forms another cross connection between the two tubes A and supports the steering-heads B for two steering-wheels C C', each carried in its appropriate fork B'. The steering is effected from the back by a steering-rod D, pivoted in the framing and provided with a handle-bar D', to be controlled by the rear rider, who sits upon the saddle E. At the lower end of the rod D is a chain-wheel $D^2$, around which passes a short length of pitch-chain F, connected by rods F' to similar short lengths $F^2$ of pitch-chain, which gear with sprocket-wheels $B^2$, fixed upon the stems of the forks B', a rod $F^3$ being employed to connect the two portions of chain $F^2$ at the opposite sides of the machine, so that the three chain-wheels $D^2\ B^2\ B^2$ are geared together by the endless connection F F' $F^2\ F^3$ under the control of the steering handle-bar D', whereby the forks are movable to turn the wheels C C' by which the vehicle is steered.

The steering might be controlled from the front or other portion of the machine, and the connections between the steering-handle and the road-wheels under its control are not necessarily such as are hereinbefore described by way of example. The saddle E is carried on a central tube or frame $A^3$, which carries also other seats or saddles E' $E^2\ E^3$, the first and last being by preference so arranged that the persons using those seats sit facing forward, though the persons using the other seats face sidewise.

For the feet of the riders foot-boards G, rests, or equivalent are provided. The person who uses the rear saddle E, which is raised higher than the others, is intended to have control of the vehicle. All the necessary handles for starting, regulating, steering, braking, and generally controlling the vehicle are arranged in proximity to that saddle.

H are the cylinders of the motor, which preferably should be an explosion-engine of the well-known Pennington type. They are carried by the cross-tube $A^2$ and supplied with oil from a reservoir H', fixed on the framing.

$H^2$ is the driving-shaft of the motor, which is geared through intermediate gearing, hereinafter described, to the gear road-wheel or driving-wheel J, the shaft J' of which is journaled in bearings $A^4$, fixed to the main tubes A of the frame.

$H^3$ are connecting-rods, by which the movement of the pistons of the motor-cylinders is converted into rotary motion of the shaft $H^2$, and $H^4$ are pitch-chains, whereby the motor-shaft $H^2$ is geared to intermediate sprocket-wheels K, Fig. 1, carried upon a sleeve $K^3$, Fig. 2, which is rotatable upon the rearmost one of the stays A'. Upon this sleeve are fixed another pair of sprocket-wheels K', which are geared by pitch-chains $H^5$ to other sprocket-wheels $J^4$, rotatable about the shaft J'. The two sprocket-wheels $J^4$ are of different sizes, so that when driven by the motor they will turn at different speeds, either one of them at a time being coupled to the road-wheel J by means of clutches $J^2$ (indicated in Fig. 2) and controlled by levers, such as $J^3$, Fig. 1, which preferably should be so arranged that when one clutch is in gear the other is out of gear. Thus the speed of the road-wheel J in relation to the speed of the motor depends upon which of the two sprocket-wheels $J^4$ is caused by the clutches to engage with the road-wheel. The proportions of this chain-gearing are such that the angular velocity of the driven wheel J is considerably less than that of the motor crank-shaft $H^2$.

$H^6$ is a fly-wheel fixed on the shaft $H^2$.

N is a handle controlling a rod N', connected to a valve at $N^2$, whereby admission of oil to the motor-cylinders is regulated.

O is an electric battery, and O' a switch-carrier on the handle D' to control the current led from the battery to the igniter of the motor.

Instead of explosive-engines any other suitable type of motor can be employed operating directly or through the medium of any desired type of gearing upon the driven road-wheel J.

Beneath each of the side foot-boards G is a quieting-chamber L, Fig. 1, of any suitable construction, into which the exhaust-gases from the motor-cylinders H are delivered. The heat given up by these gases in the quieting-chambers serves to warm the side foot-boards G.

It is convenient, especially where explosion-engines are employed to drive the vehicle, that cycle-cranks, such as M, should be provided and geared, as by the chain M', to the sleeve $K^3$, as shown, which carries the intermediate gear K K'. The said sleeve $K^3$ encircles the stay A', having fixed upon it the intermediate chain-wheel K K', hereinbefore referred to, and also a chain-wheel, concealed by the chain M' in the drawings, which by the said chain is connected to a similar but smaller chain-wheel on the crank-shaft $M^2$ of the cranks M, which is supported in a bearing $A^5$ upon one of the frame-tubes A and a bearing $A^6$ on the frame-tube $A^3$. The cranks M are under the control of the person seated on the saddle E and constitute a starting-gear for the vehicle and also a foot-rest for the rider in that saddle. Instead of being geared to the intermediate shaft the cranks could be geared to the motor-shaft or to any one or more road-wheels of the vehicle.

$A^7$ is a reversely-curved stay-tube of two circular bends, the center of each bend being in the seat or saddle placed within it and the stay-tube serving as a back or rest for the rider in that seat.

$A^8$ are supporting-tubes, by which the curved stay is connected with the main tubes A of the frame. It will be seen that at the front end of the vehicle the tube $A^3$ is connected to a similar curved tube $A^9$, forming a rest for the rider, who occupies the front seat $E^3$. Thus the framing is in three tiers, the lowest tier being constituted by the main tubes A, the middle tier by the tubes $A^3$ $A^9$, and the top tier by the tube $A^7$.

$A^{10}$ are struts supporting a tube $A^{11}$, which extends across the angle formed by the downward bend at the rear end of the tube $A^3$.

Provision may be made for carrying luggage upon the frame.

Any suitable arrangement of brake may be employed, preferably one or more band-brakes being applied to the road-wheels of the vehicle, the said wheels being preferably provided with pneumatic tires of large size, or the compression of air occurring in the cylinders may be utilized, when the oil is shut off, to stop the motor and vehicle.

The cycle-cranks M will be connected with the part to be driven by ratchet or friction or other clutch mechanism so arranged that if the rider works faster than the other shaft he will exert power to propel the vehicle or rotate the engine-shaft; but when the engine-shaft runs away the cycle-shaft will be left and need not operate. Preferably this action is automatic, as in the case of a ratchet or similar clutch; but ordinary friction or grip clutches may be employed, if preferred.

Both oil and water may be carried in suitable vessels conveniently placed upon the machine, or portions or the whole of the tubular framework may be utilized for this purpose. A removable cover may be employed to protect passengers from the weather. There may be trailing wheels, if desired, with one instead of two leading or steering wheels.

I claim—

1. In a motor-vehicle, the combination of the frame, steering and driving wheels journaled thereon, a motor attached to the frame and connected to the driving-wheel by differential gearing, seats for riders or passengers supported in the longitudinal center of the frame, hollow foot-rests attached to the frame, and means for carrying the exhaust from the engine to the hollow foot-rests, substantially as set forth.

2. In a motor-vehicle, the combination of the frame, steering and driving wheels journaled thereon, a motor attached to the frame and connected to the driving-wheel by differential gearing, a seat at the front and one at the rear of the frame facing the direction of travel, intermediate seats facing laterally in opposite directions, hollow foot-rests for the front and lateral seats, and means for directing the exhaust into the foot-rests, substantially as set forth.

In testimony whereof I have hereto set my hand in the presence of the two subscribing witnesses.

EDWARD JOEL PENNINGTON.

Witnesses:
JOHN B. CARSE,
ARTHUR LOYD.